April 24, 1956

J. EMMI 2,743,072

COLLAPSIBLE WING SYSTEM FOR AIRCRAFT
AND ACTUATING MEANS THEREFOR

Filed Aug. 11, 1953

INVENTOR
JOSEPH EMMI, JR.

BY *J. P. Keiper*

ATTORNEY

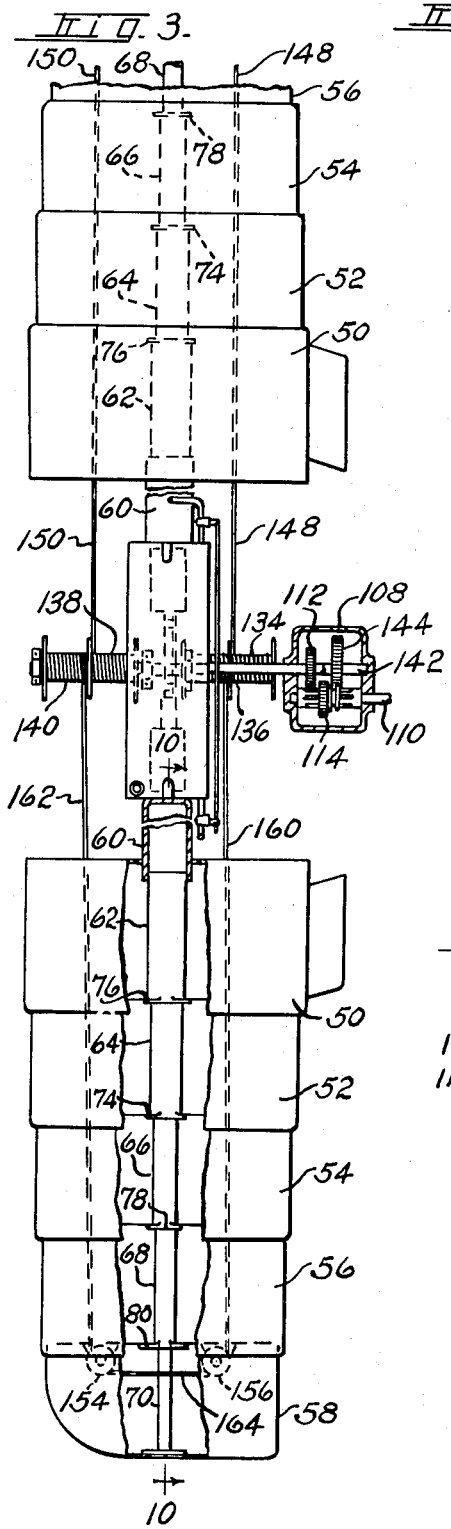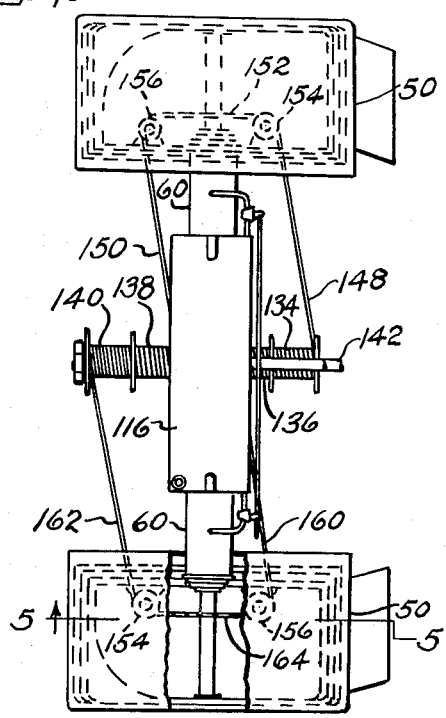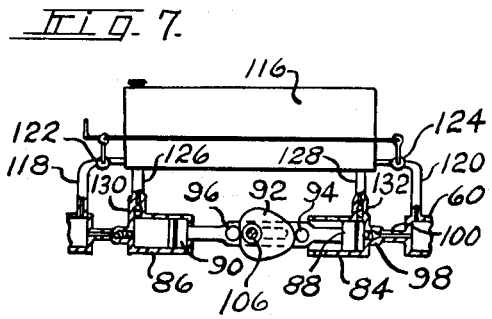

April 24, 1956 J. EMMI 2,743,072
COLLAPSIBLE WING SYSTEM FOR AIRCRAFT
AND ACTUATING MEANS THEREFOR
Filed Aug. 11, 1953 4 Sheets-Sheet 3
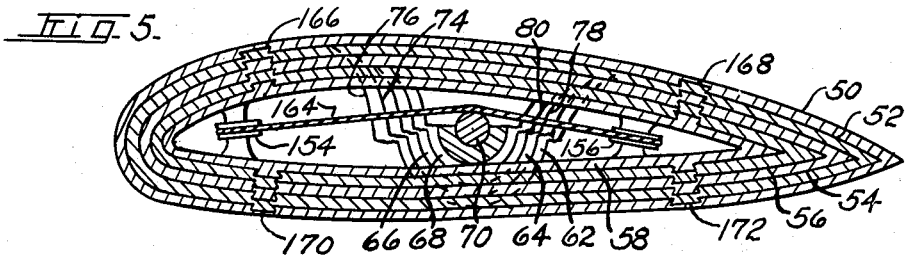
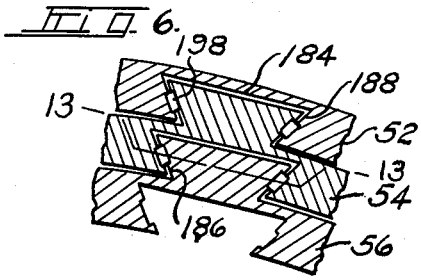
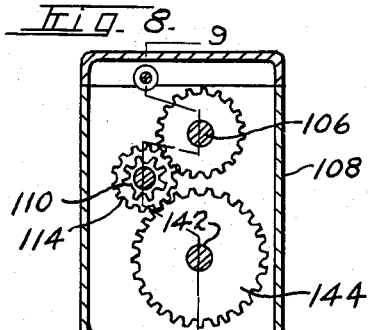
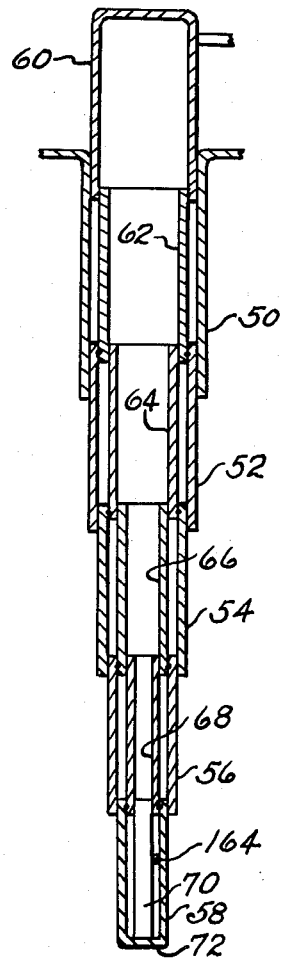
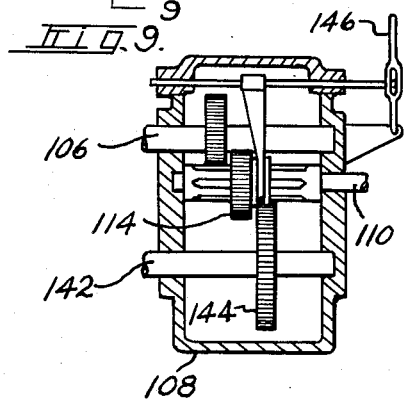
INVENTOR
JOSEPH EMMI, JR.
BY
ATTORNEY

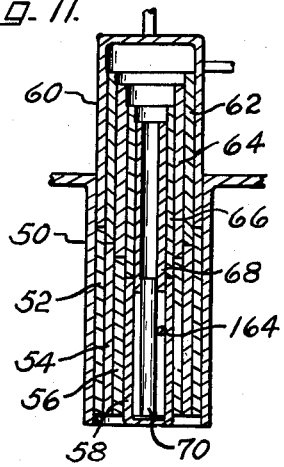
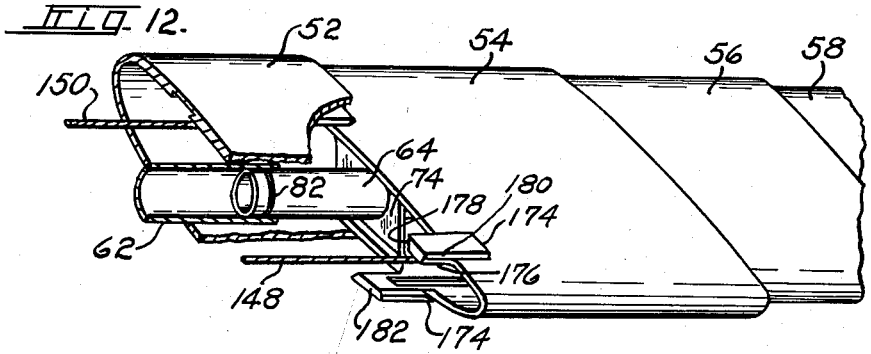
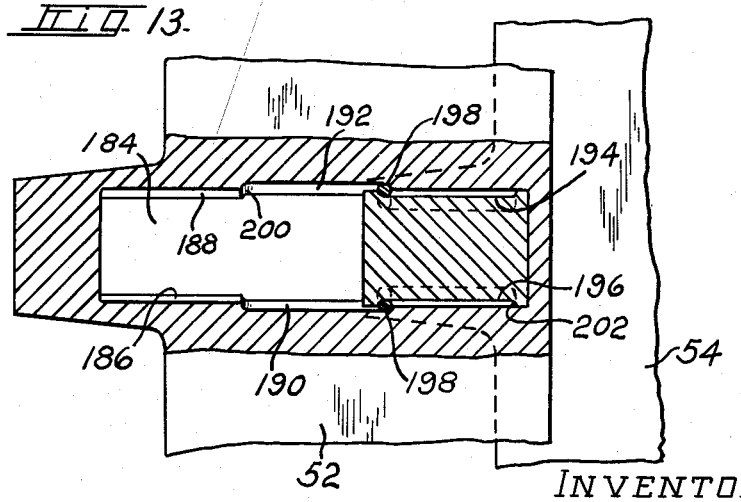

United States Patent Office 2,743,072
Patented Apr. 24, 1956

2,743,072

COLLAPSIBLE WING SYSTEM FOR AIRCRAFT AND ACTUATING MEANS THEREFOR

Joseph Emmi, Syracuse, N. Y.

Application August 11, 1953, Serial No. 373,510

1 Claim. (Cl. 244—43)

This invention relates to aircraft and more particularly to an airplane having retractable wings and having provision for operating as a helicopter.

Helicopters, for lift and flight, depend upon a substantially vertical axis rotary power driven wing structure in the form of a multibladed propeller. The presence of wings for horizontal flight on such an aircraft would seriously interfere with the lifting effect of the helicopter. While it is desirable to provide a combined helicopter for vertical ascent, and a tractor propeller airplane structure for forward flight, the wing structure heretofore required for flight so interferes with the lifting effect of the helicopter as to prevent performance.

The present invention is directed to an airplane construction, adapted to operate as a helicopter for vertical flight, the construction embodying retractable telescopic wings capable of being withdrawn so as to avoid interference with the lifting effect of the helicopter rotor. The invention is further directed to a telescopic wing structure capable of being moved from a retracted position to an extended forward flight position while in the air.

The invention further is directed to hydraulic mechanism for positively spreading the wings while under load relatively quickly, whereby the aircraft, while operating as a helicopter, may be quickly transformed into an airplane, and forward flight established without substantial loss in altitude.

The invention further has to do with provision for telescopically retracting the wing structure of an airplane, so as to permit such aircraft to operate as a helicopter without interference from the flight wings whereby descent by helicopter operation may be had.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:

Figure 3 is a plan view of the wing structure with operating parts, certain parts being shown in section, the wing structure being shown in expanded full airplane flight position;

Figure 4 is a plan view of the wing structure with operative parts shown in section and parts broken away, showing the wing structure in contracted position as for helicopter operation of the aircraft;

Figure 5 is a transverse enlarged section taken through the retracted wing substantially on the line 5—5 of Figure 4;

Figure 6 is an enlarged fragmentary section taken through several wing sections showing the roller guideways;

Figure 7 is a side elevational view with parts in section, of the hydraulic wing expanding pressure supply system;

Figure 8 is an end view of the selective drive transmission for retracting or expanding the wing structure;

Figure 9 is a broken sectional view taken on the line 9—9 of Figure 8;

Figure 10 is a longitudinal vertical section taken through an expanded wing; substantially on line 10—10, Figure 3;

Figure 11 is a longitudinal vertical section taken through a retracted wing;

Figure 12 is a fragmentary perspective of a wing section and adjoining sections, and Figure 13 is an enlarged section taken substantially on the line 13—13 of Figure 6.

Figure 1:
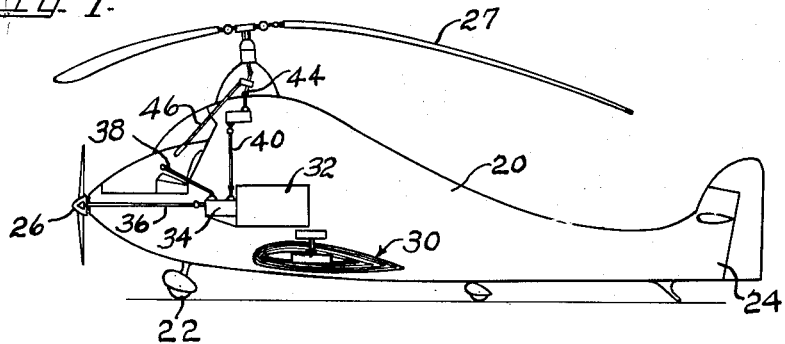
Figure 1 is a side elevation of an aircraft adapted for helicopter and airplane operation, the operating elements thereof being diagrammatically illustrated in connection therewith.
Figure 2:
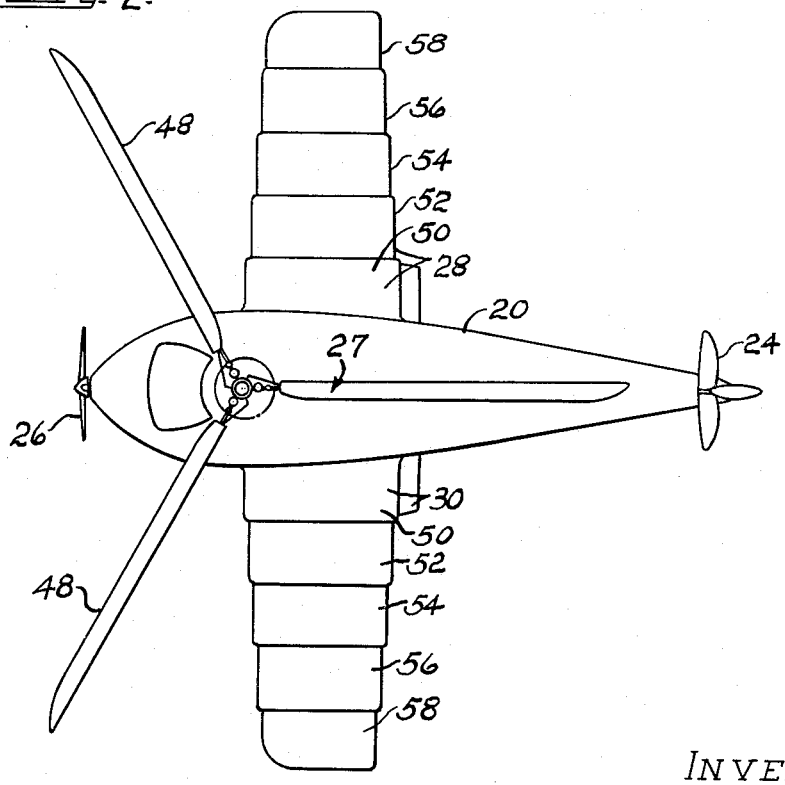
Figure 2 is a top plan view of the aircraft, showing its wings expanded to full airplane flight position.

In the drawings, and particularly Figures 1 and 2, there is shown an aircraft fuselage 20 having landing gear 22, tail structure 24 having the usual control surfaces, a tractor propeller 26, and a three-bladed helicopter rotor 27. The fuselage 20 is provided with a main wing structure comprising wings 28 and 30, such wings being extendable and retractable as will more fully appear hereinafter.

Within the fuselage, there is provided a power plant 32 having a drive transmission 34 for selectively or simultaneously driving the propeller 26 or the rotor 28. The propeller drive comprises a propeller shaft 36. Control thereof may be by a clutch actuated by lever 38. The rotor is driven by a shaft 40, a reduction gear 42, and a universally mounted drive shaft 44, the usual control over the rotor 28 being had through the lever 46, which control may consist of varying the pitch of the rotor blades 48 or the angle of the axis relative to the fuselage. Each of the wings 28 and 30 is composed of a series of telescopic sections 50, 52, 54, 56, and 58, the section 50 being affixed to the fuselage and main frame (not shown), and the other sections being adapted to telescope therewithin for wing retraction or by extending therefrom for wing extension or projection.

In Figure 3, there is disclosed the two wings in projected position, with the hydraulic tubular telescopic sectional spar utilized for hydraulically extending the wing, as well as the cable retracting means for telescopically retracting the wing from a projected position. In Figure 4, the wing is shown in retracted position.

As more particularly shown in Figure 10, each wing comprises a series of air foil sections adapted to telescope within one another, the sections being 50, 52, 54, 56, and 58. The section 52 is of such shape as to neatly telescope within the section 50, and the sections 54, 56 and 58 are adapted to telescope within their adjacent inboard sections.

Hydraulic means are provided for projecting the sections to the position as shown in Figure 10, such hydraulic means comprising an end closed cylinder 60 and a series of telescopic sleeves 62, 64, 66, and 68, each having an external diameter similar to the internal diameter of its adjacent inboard sleeve. The sleeve 68 is closed at its outer end by a cylindrical strut 70, which extends to the tip 72 of the air foil section 58. The sleeve 64 is joined at its outer end to the air foil section 54 by a webbing 74, and the other sleeves 62, 66, and 68 are similarly joined to their respective air foil sections 52, 56 and 58, by webbing 76, 78, and 80, respectively. The sleeves 62, 64, 66, and 68, and the cylinder 60, make fluid-tight connections with respect to one another, suitable packing between each adjacent pair of sleeves being provided in the manner as shown at 82 on sleeve 64. Hydraulic pressure is supplied to the opposite cylinders 60 from a pair of pumps 84 and 86, having pistons 88 and 90 driven by a heart-shaped cam 92 and cam followers 94 and 96. The pump 84 discharges through an outflow check valve 98 and a conduit 100 leading to the right hand wing cylinder 60. The pump 86 discharges through an outflow check valve 102 and a conduit 104 to the left hand wing cylinder 60. The cam 92 is mounted on a shaft 106 extending to the transmission housing 108, where such shaft is driven by the power shaft 110 through manually meshed gears 112 and 114. The power shaft may be driven by an electric motor deriving its power from a generator driven by the power plant 32, or may have a direct connection to the power plant, as may be desired.

There is also provided a hydraulic fluid reservoir 116 having conduits 118 and 120, each having valves 122 and 124 leading from the left and right hand cylinders 60 to the reservoir 116. The reservoir is also connected to each of the pumps 84 and 86 by supply conduits 126 and 128, which supply conduits each include a check valve 130 and 132 restricting flow in a direction to the pumps 84 and 86.

When it is desired to project the wings from their retracted position, the gears 112 and 114 are meshed and the cam 92 rotated, reciprocating the piston 88 and 90 within the pumps 84 and 86. Such pumps draw hydraulic fluid from the reservoir 116 and deliver such fluid under pressure into the right and left hand cylinders 60, thereby expanding the telescopic sleeves from the position shown in Figure 4 to that shown in Figure 3.

In order to retract the wings and cause the sections thereof to telescope within one another, there is provided a drum and cable mechanism, such mechanism comprising four drums 134, 136, 138 and 140, mounted on a common drive shaft 142, which shaft is adapted to be driven from the power shaft 110 by the manual meshing of the gear 114 with the gear 144 on shaft 142. Shifting of the gear 114 into mesh with gear 112 or 144 is effected by a manual control 146. Secured to and adapted to be reeled upon drums 138 and 134 are the ends 148 and 150 of a cable extending through the hollow right hand telescopic wing sections, such cable having a loop 152 passing over spaced pulleys 154 and 156 in the right hand tip section 58. Such pulleys permit equalization of the pull of the ends 148 and 150, the loop end of the cable passing over the cylindrical end member 70 of the tip section. Upon the drums 136 and 140, are reeled the ends 160 and 162 of a cable extending into the left hand section, such cable being looped as at 164 around pulleys 154 and 156 within the left hand tip section 58.

It will thus be seen that when it is desired to telescopically retract the wing sections, the drums 134–140, inclusive, will be rotated in a direction to reel the cable ends 148—150 and 160—162. During retraction, the valves 122 and 124 will be opened to permit the hydraulic fluid within the telescopic sleeves to return to the reservoir 116.

The adjacent wing sections are preferably provided with dovetailed interlocking projecting guides and grooves. In order to reduce the friction between the guides and grooves, roller bearings may be employed. The dovetailed guides may be located at four points, as shown in Figure 5, and as generally indicated at 166, 168, 170, and 172. Each of the sections 52, 54, 56, and 58 will preferably be provided with four guides, one of which 174 is shown in Figure 12. The guide 174 is mounted upon an inwardly extending arm 176, and the guide is provided with inclined surfaces 178 and 180, forming the dovetail cross-sectional shape seen at 182. The dovetail cross-sectional shape of each of the guides 174 interlocks within guideway channels 184 having undercut inclined surfaces 186 and 188, such channels being located on the inside surface of the wing sections 50, 52, 54 and 56. The respective surfaces 186 and 188, and 178 and 180, are relieved as at 190 and 192, and as at 194 and 196, respectively, to provide rollerways for one or more rollers such as 198, it being understood that the ends of the rollerways form shoulders such as 200 and 202, which are adapted to limit the relative movement between the sections so as to establish a fully retracted position and a fully projected position, in respect to each section of adjacent telescopic sections.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

In an aircraft adapted for helicopter and airplane flight, a fuselage, a main wing structure, said wing structure comprising symmetrical right and left hand wings projecting from said fuselage, each of said wings being composed of telescopic airfoil sections of successively lesser cross section, the largest section being rigidly secured to said fuselage, and the remaining sections being adapted to nest substantially completely within one another and within the largest section, sliding guides and cooperating guideways carried by adjacent sections, hydraulic means comprising a plurality of telescopic sleeves located centrally of said airfoil sections within each of said wings, having their outer ends secured adjacent to the inner ends of respective sections for extending said sections to provide wing surfaces for sustaining forward flight, said hydraulic means including a reservoir within said fuselage and pumping means for simultaneously delivering equal amounts of pressure fluid to the telescopic sleeves of both wings, and mechanical means within each of said wings comprising equalizing cable loops extending through the wings on opposite sides of the hydraulic means and drums therefor mounted for rotation on a common axis within the fuselage for telescoping said sections to minimize interference during helicopter flight.

References Cited in the file of this patent

UNITED STATES PATENTS

| | | |
|---|---|---|
| 1,761,444 | Jones | June 3, 1930 |
| 1,875,891 | Salisbury | Sept. 6, 1932 |
| 2,038,337 | Ballmann | Apr. 21, 1936 |
| 2,249,729 | Fitzurka | July 22, 1941 |
| 2,423,095 | Gibson | July 1, 1947 |
| 2,661,168 | Mortka | Dec. 1, 1953 |

FOREIGN PATENTS

| | | |
|---|---|---|
| 48,541 | Switzerland | Aug. 14, 1909 |
| 816,813 | France | May 10, 1937 |
| 921,308 | France | Jan. 10, 1947 |